(No Model.)
C. C. PACKARD.
PHOTOGRAPHIC SHUTTER.
No. 549,681. Patented Nov. 12, 1895.
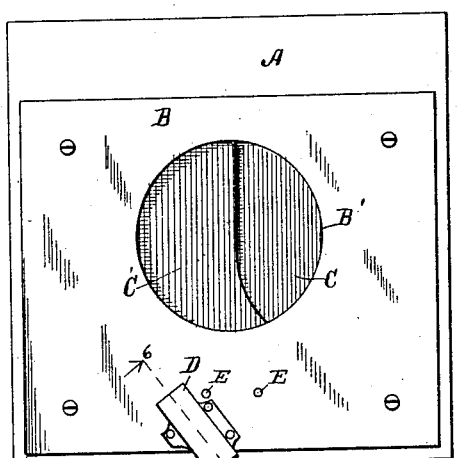
Fig. 1
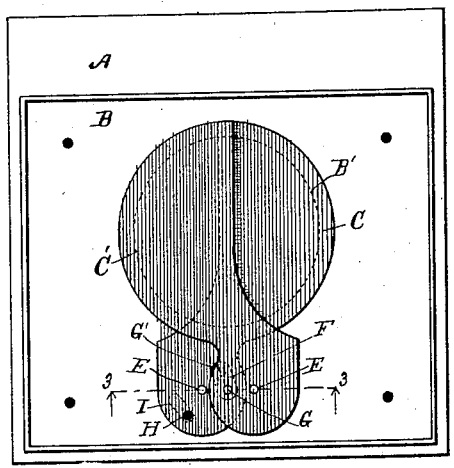
Fig. 2
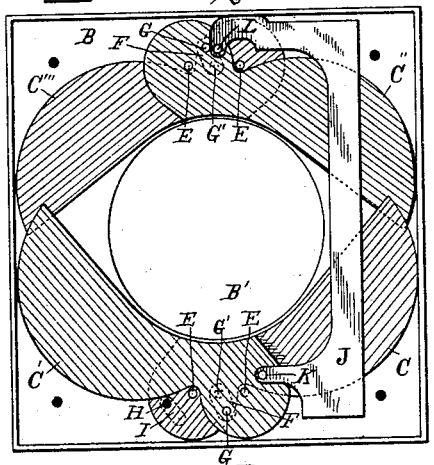
Fig. 7
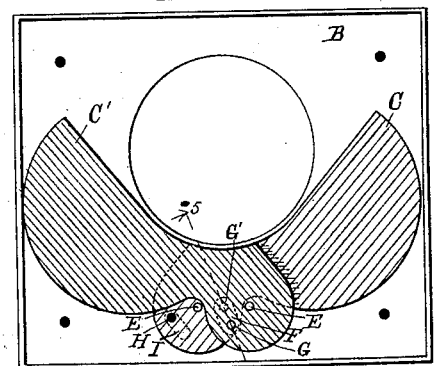
Fig. 3
Fig. 4
Fig. 5
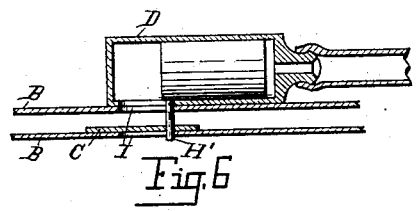
Fig. 6
Witnesses:
Walter S. Wood
Marian J. Longyear
Inventor,
Cullen C. Packard
By Fred L. Chappell
Atty.
ANDREW B.GRAHAM. PHOTO-LITHO. WASHINGTON.D.C.

UNITED STATES PATENT OFFICE.

CULLEN C. PACKARD, OF KALAMAZOO, MICHIGAN.

PHOTOGRAPHIC SHUTTER.

SPECIFICATION forming part of Letters Patent No. 549,681, dated November 12, 1895.

Application filed March 29, 1895. Serial No. 543,686. (No model.)

*To all whom it may concern:*

Be it known that I, CULLEN C. PACKARD, a citizen of the United States, residing at the city of Kalamazoo, in the county of Kalamazoo and State of Michigan, have invented certain new and useful Improvements in Photographic Shutters, of which the following is a specification.

My invention relates to improvements in photographic shutters.

The main object of my invention is to provide a shutter which shall be so simple that in its operation the friction of the parts will be reduced to the minimum, consequently making a shutter which is very quick in its action and one that can be very easily controlled.

Another object is to provide, in a winged shutter, a construction which shall prevent the interfering of one of a pair of wings with the opposite wing in its operation, so that the same shall close together evenly and smoothly without danger of collision between the wings.

Other objects will appear in the detailed description.

I believe that I have produced a photographic shutter which has fewer parts, all pivotally connected, than any shutter heretofore produced.
I accomplish the objects of my invention by the devices shown in the accompanying drawings, in which—

Figure 1 shows a rear elevation of a shutter attached to the front board of a camera.
Fig. 2 is another elevation of the same with the back side of the shutter-case removed, showing the wings in the closed position. Fig. 3 is a view similar to Fig. 2, showing the shutter open. Fig. 4 is an enlarged detail sectional view on line 3 3 of Fig. 2. Fig. 5 is an enlarged detail sectional view on line 5 5 of Fig. 3. Fig. 6 is an enlarged detail sectional view on line 6 6 of Fig. 1, and Fig. 7 shows a four-winged shutter embodying the principle of my invention.

In the drawings all of the sectional views are taken looking in the direction of the arrows at the ends of the section-lines.

Similar letters of reference refer to similar parts throughout the several views.

Referring to the lettered parts of the drawings, A is the front board of a camera.

B is the shutter-case, which is secured to the front board of the camera by screws or any other well-known means.

B' indicates an aperture through the shutter-case, which allows light to pass into the camera from the lens-tube.

The shutter-wings C C' are pivoted at E and are adapted to close over the aperture B' in the shutter-case to exclude light or to open it to admit light. These shutter-wings cross each other somewhat similar to the blades of a pair of shears, which insures to a certainty the edges of the shutter-wings passing by each other and closing over the aperture B' perfectly at every operation without danger of undue friction or a collision. Connecting the shutter-wings together is a short link F, which is pivoted to the shutter-wing C at G' and to the shutter-wing C' at G, as will clearly appear in the drawings. A small pneumatic engine D is secured to the case B. A pin H' projects from the piston in the said engine through a slot in the case and through a hole H in one of the wings C or C'. In the drawings the pin H' is shown projecting through a hole H in the wing C. A suitable tube is attached to the engine and passes to a rubber bulb or any other suitable means at the end to actuate the engine in a manner already well known in devices of this character.

In operating my improved engine air is forced into or withdrawn from the pneumatic engine D, and by its operation opens and closes the pivoted shutter-wings. The pin H' of course will actuate the wing C, and link F, connecting it to the wing C', causes it, through its action, to actuate the shutter-wings C', so that they open opposite to each other when air is forced into the engine and close when air is drawn out. This pivotal connection and pivoting of the pin H' of the engine to the wing C close to its turning-point permits the same to actuate the shutter with a very slight motion, and consequently with great rapidity and ease. Placing the link F between the wings enables it to be held securely in place without any special means for retaining it there.

In Fig. 7 I show my device adapted for use in a four-winged shutter. In that instance two pairs of wings—a pair above and a pair below—are connected the same as a single pair of wings, and a link portion J extends out around the aperture B' to one side and connects the wing C' to the wing C'', so that there is a link connection all through, giving a pivotal connection for all the mechanism of the shutter and making it necessary to have only a very slight motion, thus enabling a pneumatic engine to actuate the same with great rapidity. With the four-wing shutter the wings can be made narrower, and will thus admit of quicker action than broader heavier wings and will also permit of a smaller case being used in proportion to the size of the aperture B' through the shutter-case.

I desire to say that my improved shutter can be considerably varied in its details without departing from my invention. Any number of pairs of wings can be connected together in this way, and the exact location of the link F is not material, although the short link that I have shown located between the pivots E E is much preferred on account of its reducing the weight of the connections to the minimum.

Having thus described my invention, what I clam as new, and desire to secure by Letters Patent, is—

1. In a photographic camera, the combination of the shutter case, B; wings, C, C', pivoted on pivots, E, E, in said case and crossing each other similar to a pair of shears; a link, F, located between said shutter wings and pivotally connecting the same together at the pivots, G' and G; a pneumatic engine, D; a pin, H', extending from the piston in said engine through a slot in the case and through the hole, H, in one end of the shutter wings, all co-acting together substantially as described for the purpose specified.

2. In a photographic shutter, the combination of the shutter case, shutter wings pivoted on independent pivots in said case; a link connecting said shutter wings together; a pneumatic engine; a pivot pin actuated by said pneumatic engine and passing through one of the shutter wings to actuate the same, substantially as described.

3. In a photographic shutter, the combination of the shutter case, B; pairs of shutter wings pivoted on independent pivots; links connecting the shutter wings in said pair together; a link, J, connecting the pairs of said shutter wings together; and suitable means of actuating the same, for the purpose specified.

In witness whereof I have hereunto set my hand and seal in the presence of two witnesses.

CULLEN C. PACKARD. [L. S.]

Witnesses:
 MARIAN LONGYEAR,
 WALTER S. WOOD.